United States Patent
Kern et al.

[15] 3,656,896
[45] Apr. 18, 1972

[54] PROCESS FOR THE MANUFACTURE OF FINE PARTICULATE MADDRELL'S SALT

[72] Inventors: Winfried Kern, Hurth near Cologne; Oskar Gehrig, Mannheim; Heinz Harnisch, Lovenich near Cologne, all of Germany

[73] Assignees: Knapsack Aktiengesellschaft, Knapsack near Koln; Benckiser-Knapsack GmbH, Ludwigshafen am Rhine, Germany

[22] Filed: Nov. 4, 1970

[21] Appl. No.: 86,969

[30] Foreign Application Priority Data

Nov. 13, 1969 Germany ..................... P 19 57 063.9

[52] U.S. Cl. .................................................. 23/106
[51] Int. Cl. ................................................ C01b 25/30
[58] Field of Search ....................................... 23/106

[56] References Cited

UNITED STATES PATENTS

| | | |
|---|---|---|
| 2,356,799 | 8/1944 | Taylor et al. .......................... 23/106 A |
| 2,737,443 | 3/1956 | Wright ................................. 23/106 A |
| 2,776,187 | 1/1957 | Pfrengle .............................. 23/106 A |
| 2,916,354 | 12/1959 | Edwards ............................. 23/106 A |
| 2,977,317 | 3/1961 | Rodis et al. ....................... 23/106 A X |
| 3,361,523 | 1/1968 | Shen ................................... 23/106 R |
| 3,210,154 | 10/1965 | Klein et al. ......................... 23/106 R |

*Primary Examiner*—Oscar R. Vertiz
*Assistant Examiner*—Charles B. Rodman
*Attorney*—Connolly and Hutz

[57] ABSTRACT

Production of fine particulate Maddrell's salt by subjecting coarsely granular Maddrell's salt to grinding. The ground Maddrell's salt is annealed for a period of between 0.5 and 4 hours at a temperature of between 360° and 420° C., and a product with a low fraction of water-soluble matter therein is obtained.

4 Claims, No Drawings

PROCESS FOR THE MANUFACTURE OF FINE PARTICULATE MADDRELL'S SALT

The present invention relates to the production of fine particulate Maddrell's salt by subjecting coarse Maddrell's salt to grinding.

Fine particulate Maddrell's salt finds especially wide-spread use as a polishing agent in tooth pastes. For this purpose, it is desirable to have material, which has less than 3 weight percent of water-soluble substances therein and consists of fine particles.

The manufacture of Maddrell's salt having a low proportion of water-soluble substance therein has been described in French Patent Nos. 1,549,914 and 1,570,296. On subjecting the products so made to fine grinding, it is found, however, that the grinding step effects a considerable increase in the initially low water-solubility of the salt.

While the process reported in U.S. Pat. No. 2,356,799 is said to produce Maddrell's salt having a water-soluble fraction of less than 4 weight percent therein, it has been shown in Journal of American Society 81 (1959), page 79 that the products so made in fact contain a water-soluble fraction of practically always 5 weight percent.

The present invention now unexpectedly provides a process enabling the increase in the water-solubility of Maddrell's salt, which is occasioned on subjecting the salt to fine grinding, to be nullified in simple fashion and fine particulate Maddrell's salt with a low proportion of water-soluble substance therein to be produced in purposive manner, which process comprises subjecting ground Maddrell's salt to annealing treatment for a period of between 0.5 and 4 hours, preferably 1 and 2 hours, at temperatures of between 360° and 420° C., preferably 380° and 400° C.

The annealing step should conveniently be carried out in a heated rotating tube.

It is advantageous, prior to effecting the annealing step, to subject coarse Maddrell's salt, which is produced in conventional manner, to grinding so as to obtain particles of which 99 percent have a size of less than 40 microns.

In the process of the present invention, it is even possible to use Maddrell's salt having up to 5 weight percent of an acid pyrophosphate contaminant therein, without the soluble fraction of the final product being increased thereby.

The annealing step of the present invention could not be expected to produce the effect described above, as the ground salt fails to sinter or cake together or undergo any other coarsening of its particles, during the annealing step.

The annealing step does not simply effect full dehydration of the product. What it effects is an inactivation of the product's surface with the result that the ground salt ceases to provide further water, during the annealing treatment. The products treated as described in the present invention have a water-soluble fraction of less than 3 weight percent therein.

In French Patent 1,570,296 it has been reported that the narrow temperature range, within which the conversion of acid sodium phosphate to Maddrell's salt takes place within commercially attractive periods, is one of the particular difficulties that are encountered in the production of Maddrell's salt, together with the need to maintain a given steam partial pressure value. While the above conversion is theoretically initiated at temperatures above 250° C., the fact remains that temperatures of about 400° C. and more are required to be produced to make the reaction proceed at a speed satisfactory for commercial purposes. On the other hand, however, Maddrell's salt is known to commence conversion to sodium trimetaphosphate, at temperatures around 450° C.

This problem is obviated by the annealing step of the present invention, which even enables up to 5 weight percent of pyrophosphate, based on the weight of Maddrell's salt used, to be completely transformed into difficultly soluble Maddrell's salt, and this again in the absence of any caking phenomena in the rotating tube, or coarsening of the particles of the final product.

In other words, in the process of the present invention it is no longer imperative that the $NaH_2PO_4$ be completely dehydrated to Maddrell's salt in a single step, as in earlier processes. As results therefrom, a considerably enlarged margin is available for the maximum dehydration temperature, and the process is technically easier to carry out.

EXAMPLE 1

A 5 gram specimen of $NaH_2PO_4$ was dehydrated in the manner described in French Patent No. 1,570,296 to Maddrell's salt, and the salt was crushed in a procelain mortar. The specimen was found to have a solubility of 0.72 percent. It was then ground for several hours in an agate mortar until it could be passed through a 40 micron sieve, without residue. After that treatment, the solubility was 11.1 percent. The specimen so treated was annealed for 30 minutes and then had a solubility as low as 1.5 percent.

EXAMPLE 2

20 kg/hr of finely ground Maddrell's salt (99 percent < 40 microns) were conveyed through an electrically heated rotating tube, which was 2.50 meters long and 250 millimeters wide. The product reached a temperature of 380° C.

The Maddrell's salt so treated contained the following proportions of soluble matter:

| Prior to annealing treatment | After annealing treatment |
|---|---|
| 5.46 weight percent | 2.38 weight percent |
| 4.16 weight percent | 2.43 weight percent |
| 3.99 weight percent | 2.60 weight percent |
| 2.56 weight percent | 2.04 weight percent |

99 Weight percent of the product had a particle size of less than 40 microns, prior to and after the annealing treatment.

EXAMPLE 3

A specimen of Maddrell's salt, which was prepared in the manner described in French Patent 1,570,296, was found to have a solubility of 5.35 grams of $P_2O_5$, based on 100 grams of substance. The specimen contained acid pyrophosphate in a proportion of 3.0 grams/100 grams, based on $P_2O_5$. The specimen was annealed for 30 minutes at 380° – 400° C. and then had a solubility of only 1.69 grams of $P_2O_5$ per 100 grams of substance. The proportion of pyrophosphate initially present in the feed specimen was found to have been transformed into Maddrell's salt, during the annealing step.

A comparison of the $P_2O_5$-fractions soluble prior to and after the annealing step confirmed the statement already made above that the decrease of solubility effected during the annealing is in no way solely occasioned by the removal of water of constitution.

| Solubility prior to annealing step | Pyrophosphate proportion | Theor. solubility | Actual solubility | Pyrophosphate |
|---|---|---|---|---|
| g $P_2O_5$/ 5.35 | g $P_2O_5$/ 3.0 | g $P_2O_5$/ 2.35 | g $P_2O_5$/100 g 1.69 | 0 |

We claim:

1. A process for manufacturing fine particulate Maddrell's salt having a low water-solubility which comprises grinding coarsely granular Maddrell's salt containing up to 5 weight percent of an acid pyrophosphate contaminant to particles of which 99 percent have a size of less than 40 microns, annealing the said ground Maddrell's salt particles for a period of between 0.5 to 4 hours at temperatures between 360° and 420° C. with the resultant formation of a fine particulate Maddrell's salt having a water-soluble fraction of less than 3 weight percent therein.

2. The process as claimed in claim 1, wherein the annealing treatment is effected at a temperature of between 380° and 400° C.

3. The process as claimed in claim 1, wherein the ground Maddrell's salt is annealed for a period of between 1 and 2 hours.

4. The process as claimed in claim 1, wherein the annealing treatment is effected inside a heated rotating tube.

* * * * *